US007373829B2

(12) United States Patent
Vencill

(10) Patent No.: US 7,373,829 B2
(45) Date of Patent: May 20, 2008

(54) PRESSURE CALIBRATION INSTRUMENT AND METHOD FOR USE IN SECUREMENT AND ADJUSTMENT OF FLANGES, COUPLINGS, BEARINGS, AND FASTENERS

(76) Inventor: Robert Lee Vencill, P.O. Box 63, Williams, OR (US) 97544

( * ) Notice: Subject to any disclaimer, the term of this patent is extended or adjusted under 35 U.S.C. 154(b) by 149 days.

(21) Appl. No.: 11/131,836

(22) Filed: May 17, 2005

(65) Prior Publication Data
US 2005/0251996 A1    Nov. 17, 2005

Related U.S. Application Data

(60) Provisional application No. 60/572,165, filed on May 17, 2004.

(51) Int. Cl.
*G01L 9/00* (2006.01)
(52) U.S. Cl. ....................................... 73/714
(58) Field of Classification Search ................ 73/700, 73/756
See application file for complete search history.

(56) References Cited

U.S. PATENT DOCUMENTS 6,877,382 B1 *   4/2005   Gourlay ...................... 73/718

2006/0257221 A1 *   11/2006   Taki et al. ..................... 409/37

* cited by examiner

*Primary Examiner*—Andre J. Allen
(74) *Attorney, Agent, or Firm*—Chernoff, Vilhauer, McClung & Stenzel, LLP

(57) ABSTRACT

An adjustment method and apparatus to derive a pressure and measure for the securement force and alignment of flanges, couplings, bearings, headers, and securement bolts or nuts, where at least one member is moveable in relationship to another member such as a spindle nut retaining a wheel hub and the hub's inner and outer bearings upon a spindle, the spindle nut having affixed upon or embodied within, one or more axially affixed pressure calibration instruments to sense an axial pressure, and integrated with a corresponding axial micro measurement, to identify an exact pressure reference point from which is accomplished a desired securement force, the desired securement force being either satisfied or further accomplished by a specified increment of tightening of the securement device, thusly achieving dimensional stability of the structure. The precise method of the pressure calibration instrument provides an unequaled speed of adjustment and simplicity, sets new standards in securement and stress related safety, and introduces an exacting science to alignment, securement, and bearing adjustment.

5 Claims, 5 Drawing Sheets

PRESSURE CALIBRATION INSTRUMENT AND METHOD FOR USE IN SECUREMENT AND ADJUSTMENT OF FLANGES, COUPLINGS, BEARINGS, AND FASTENERS

This application claims the benefit of Provisional application No. 60/572,165 filed May 17, 2004.

BACKGROUND OF THE INVENTION

This invention relates to the securement of flanges, headers, machinery components, bolts and nuts wherein dimensionally uniform clamping forces are desirable, to axial couplings of driven machinery wherein dimensional alignment of such flanges is critical, and to preload pressure adjustment of bearings used in machinery, and particularly to heavy duty taper roller wheel bearings in the transportation industries.

Stressed securement of couplings, flanges, and headers, and adjustment of tapered roller wheel hub bearings has been dependent upon time consuming and inaccurate prior art methods dependent upon gap gauges, digital or dial calipers and indicators, the often used mechanics guesstimate attempting to detect either bearing looseness or excessive preload by means of feeling looseness or stress by the technicians hand, voltage resistant stress materials, a screw thread torque measuring method as a final measure, a screw thread torque measurement from which to measure a final screw thread rotation, use of a dial indicator instrument to measure a perceived degree of free axial movement, or upon dial indicator measure of a perceived zero point from which to measure a final screw thread rotation.

Taper roller bearing failure analysis in the heavy duty transportation industry demonstrates that improper bearing retaining spindle nut adjustment initiates the first component failure resulting in premature wheel end component wear out, successive wheel end component failure, or culminating in vehicle-wheel separation.

Friction variables, a result of dimensional irregularities, lubricant characteristics, contamination, material alloy, finish and smoothness, wear, damage, temperature, galling, and so forth, of wheel end spindle threads, spindle nut threads, and nut face surfaces, collectively render torque-based measurements to very broad adjustment parameters. Without an exact adjustment reference point, bearing preload cannot be set without risk of severely overloading the bearings and precipitating an immediate bearing failure. Consequently, the transportation industry has been forced to adjustment procedures wherein bearings are adjusted loose, but which also reduces useable wheel end component life, results in costly maintenance and operation expenses, and compromises safety.

The industry as a whole has historically chosen to perceive this major safety problem, liability concern, and expense, to be a result of improper maintenance procedures. However, attempts to resolve these issues over the past several decades have lead the industry to adopt a variety of adjustment procedures verifiable by measurement of a minimal free bearing axial endplay. Controllable preload adjustment has not been possible with spindle nuts, measuring devices, and calibration means in present use, and a portion of the industry has attempted to resolve these wheel bearing adjustment issues by resorting to non-adjustable hubs.

The problem lies in that the common practice of endplay verification is badly flawed. Tests demonstrate that the melding of, friction variables of the wheel end components, the heavy weights of the wheel ends, the physics of the inclined planes of the double taper roller bearings, dial indicator placement, and the resultant geometry of exactly how the wheel end is moved, and conclude that verifiable free endplay is only a measure of how far the spindle mounted heavy wheel end can be readily moved in that individual situation, and as such only verifies that the wheel end is loose. A great demonstration of this is to attempt to adjust zero free play, having as an example 0.005 inch verifiable free end play as initially verified by a dial indicator measurement.

By rotating the spindle nut a corresponding degree of rotation in relationship to the spindle screw thread pitch a subsequent verification should then result in zero endplay. The need to repeat this process two or three or four times to obtain a near zero or merely an unknown point where you measure zero immediately becomes evident. The first verification measurement proved to be flawed, and it follows that subsequent verifications are equally flawed. Highly controlled laboratory experiments further verify the illogic and dramatic errors of the concept of verifiable free endplay.

The public safety and liability concerns are so serious that the National Transportation Safety Board has for several years been facilitating efforts and studies of numerous transportation and manufacturing associations to establish a scientific method of preload adjustment and measurement including the development of a test machine to compare new methods to the three piece spindle nut in use for a hundred years. These tests methods are comparative of the popular methods and devices of prior art and do not relate to specific preload pressures in non-laboratory shop and field applications nor resolve the problems. Attempting to sneak up on a desirable and verifiable axial endplay is a very time consuming process and at best the bearings are adjusted loose. At worst the bearings are excessively preloaded.

The prior art method disclosed in U.S. Pat. No. 6,257,078 precisely resolves free play and preload adjustment problems by pre-stressing the axial assembly to remove all friction and elasticity variables from the measurement and adjustment process. The spindle nut is over tightened and a dial indicator is then used to measure the relaxation of the excessive preload by measure of the wheel hub in relation to the spindle as the screw threaded spindle nut is slowly loosened. The problems with this sophisticated and precise adjustment method is that it is dependent on the knowledgeable and time-consuming use of a dial indicator. The dial indicator may be improperly installed and misused by the service personnel and in many shops and in the field an accurate dial indicator and mounting means is not available. Further more, there always exists the possibility that the inner wheel lubricant seal or other wheel end component may interfere with the hubs free axial travel upon the spindle requiring diligent observation of the technician.

In other axial alignment applications, such as securement of headers or alignment of couplings, digital and dial gauges are often used with varying degrees of success as they do not provide a measure of pre-securement stresses affecting accurate and consistent header and flange pressures, or final coupling alignment stresses. Unintended stresses are often first discovered in equipment vibration analysis studies and are further reflected in equipment component useable life and operating efficiency.

SUMMARY OF THE INVENTION

This scientific pressure calibration instrument provides a means of precision alignment, dimensional stability, and an adjustment method, repeatable for any technician, experienced or novice, suitable for large maintenance shops or individuals in the field, that before now that has only been attainable in the laboratory using time consuming methods and highly specialized tools.

The basic method of this invention in wheel bearing preload adjustment is in adjusting the bearings from an established preload pressure, reading a micro air-gap measurement, and tightening the specialized spindle nut one indexed indicia collapsing the pressure sensors and closing the air-gap, all done without axial movement of the wheel hub upon the spindle. Thusly, adjustment is accomplished by the first step of over-tightening the spindle nut of an assembled wheel end, the second step of activating the pressure calibration instrument as indicated by an "activated" LED illumination, the third step of slowly loosening the spindle nut until the pressure measuring instrument indicates a "set" LED, and the final adjustment step of rotating the screw threaded spindle nut using the visible indicia on the nut. In this manner the single threaded spindle nut is then locked from further rotation without application of additional axial or radial pressures to complete an exacting bearing preload adjustment.

DESCRIPTION OF THE EMBODIMENTS

Figure 1:
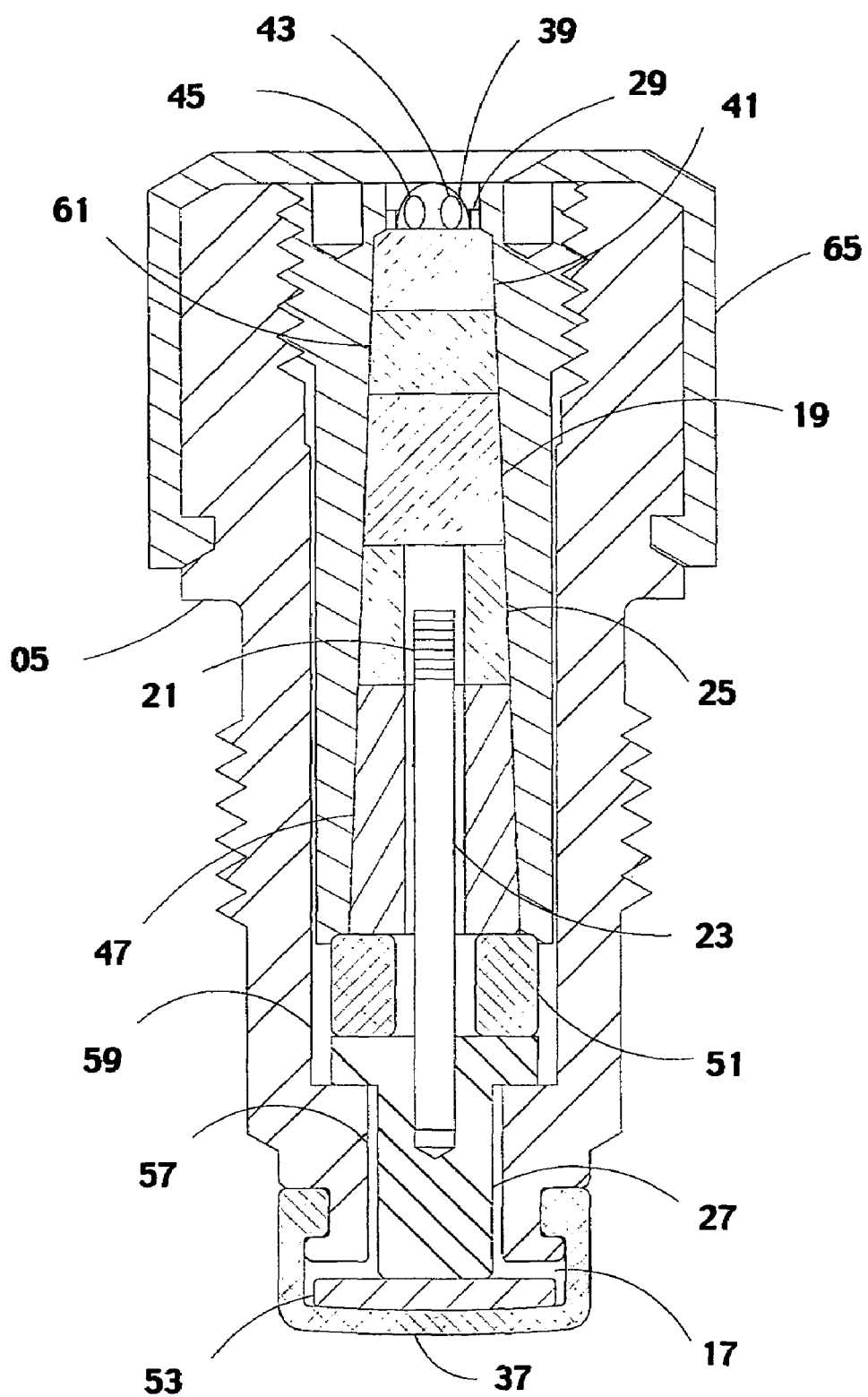
FIG. 1, Sectional side view depicting an encapsulated configuration of the pressure calibration instrument for clarity of function.
Figure 3:
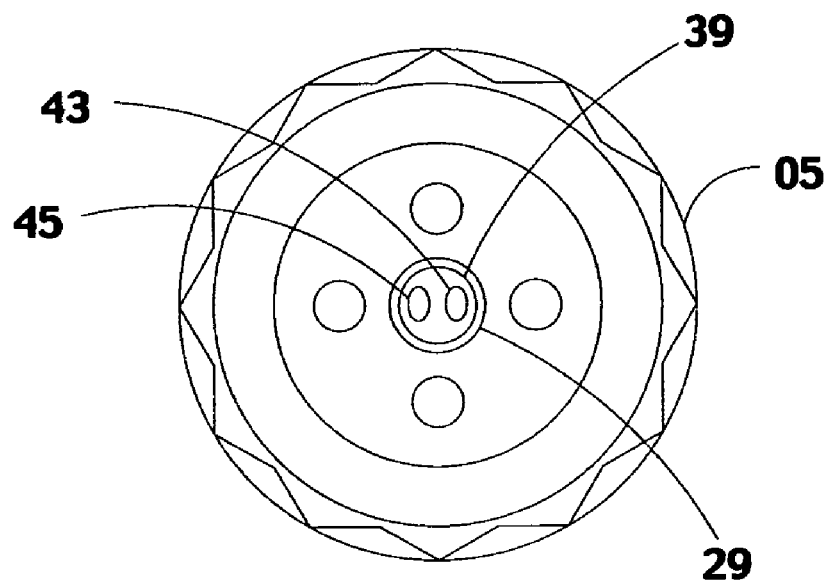
FIG. 3, Top view of the pressure calibration instrument of FIG. 1 without the highly visible tamper proof cap.
Figure 2:
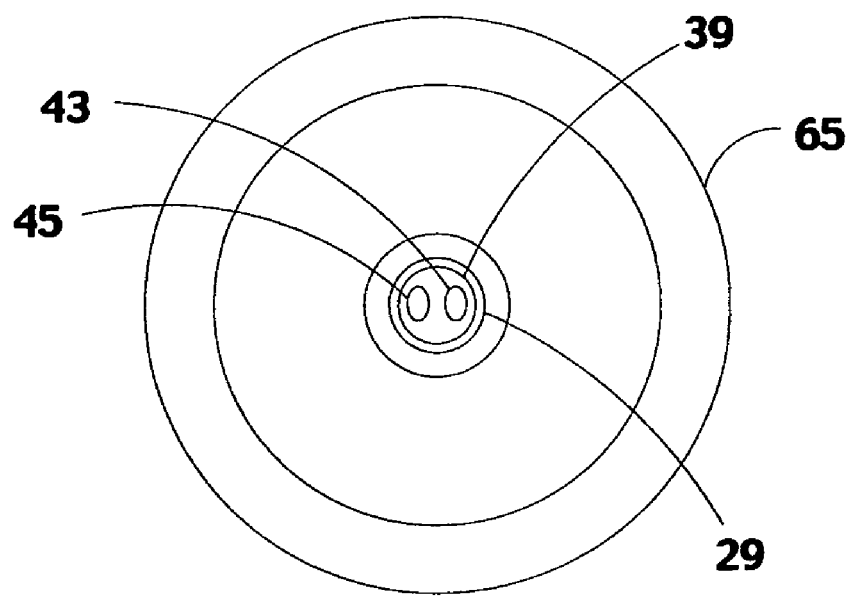
FIG. 2, Top view of the pressure calibration instrument of FIG. 1.

In reference to FIG. 1, FIG. 2, and FIG. 3. A pressure calibration means, structure, and instrument 05 having an axially moveable piston 27 within cylinder bore 57, piston 27 having affixed piston flag pole 23 to provide for micro scale 21 such that any axial travel of piston 27 is indicated by a corresponding axial travel of micro scale 21, a pressure band 51 that applies a force against piston 27 such that the pressure seated piston 27 extends several thousandths of an inch as shown by piston extension gap 17, a piston pad 53 in axial communication with piston 27 and boot seal 37, electronic components installed in instrument cavity 59 including indicator module 39 enclosing activated LED 43 and set LED 45, re-charging contact 29, activation switch 41, recharging circuitry 61, circuitry 19, micro reader 25, power pack 47, and an external tamper proof cap 65.

Figure 4:
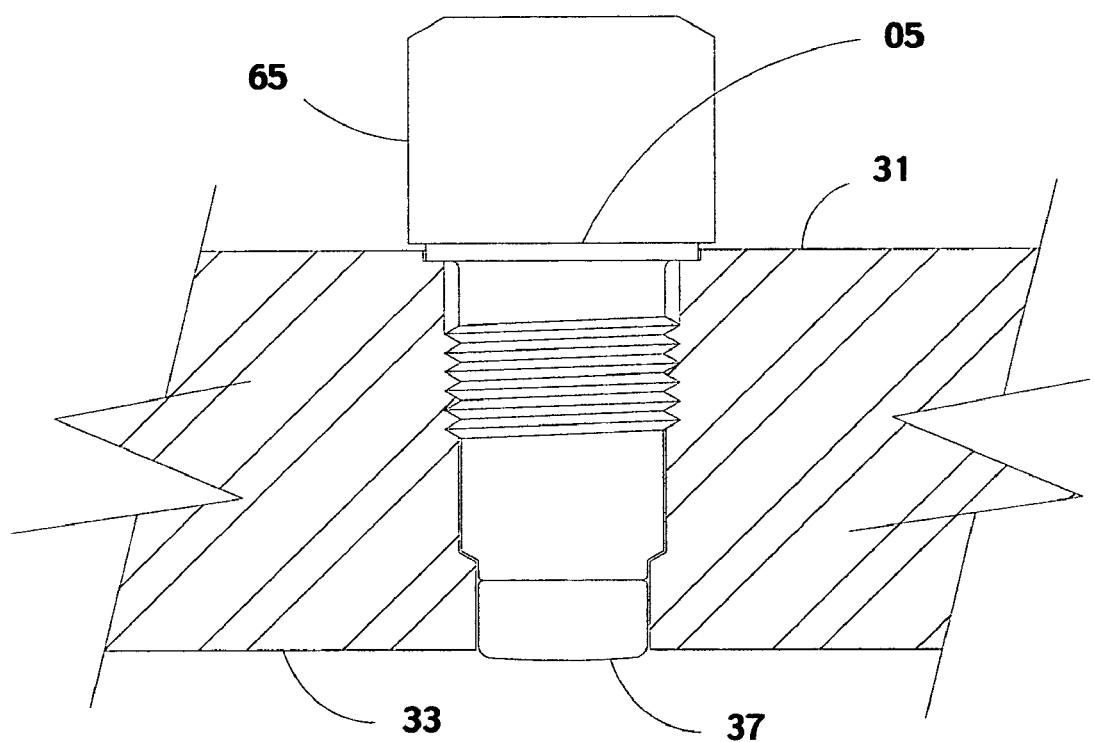
FIG. 4, Sectional view of a structure drilled and tapped to receive the pressure calibration instrument of FIG. 1 with pressure calibration instrument installed.

In reference to FIG. 4, Illustrates pressure calibration instrument 05 installed in a structure 31 such that the pressure calibration instrument 05 boot seal 37 extends beyond structure face 33 several thousandths of an inch, and pressure calibration instrument 05 is fitted with tamper proof cap 65.

Figure 5:
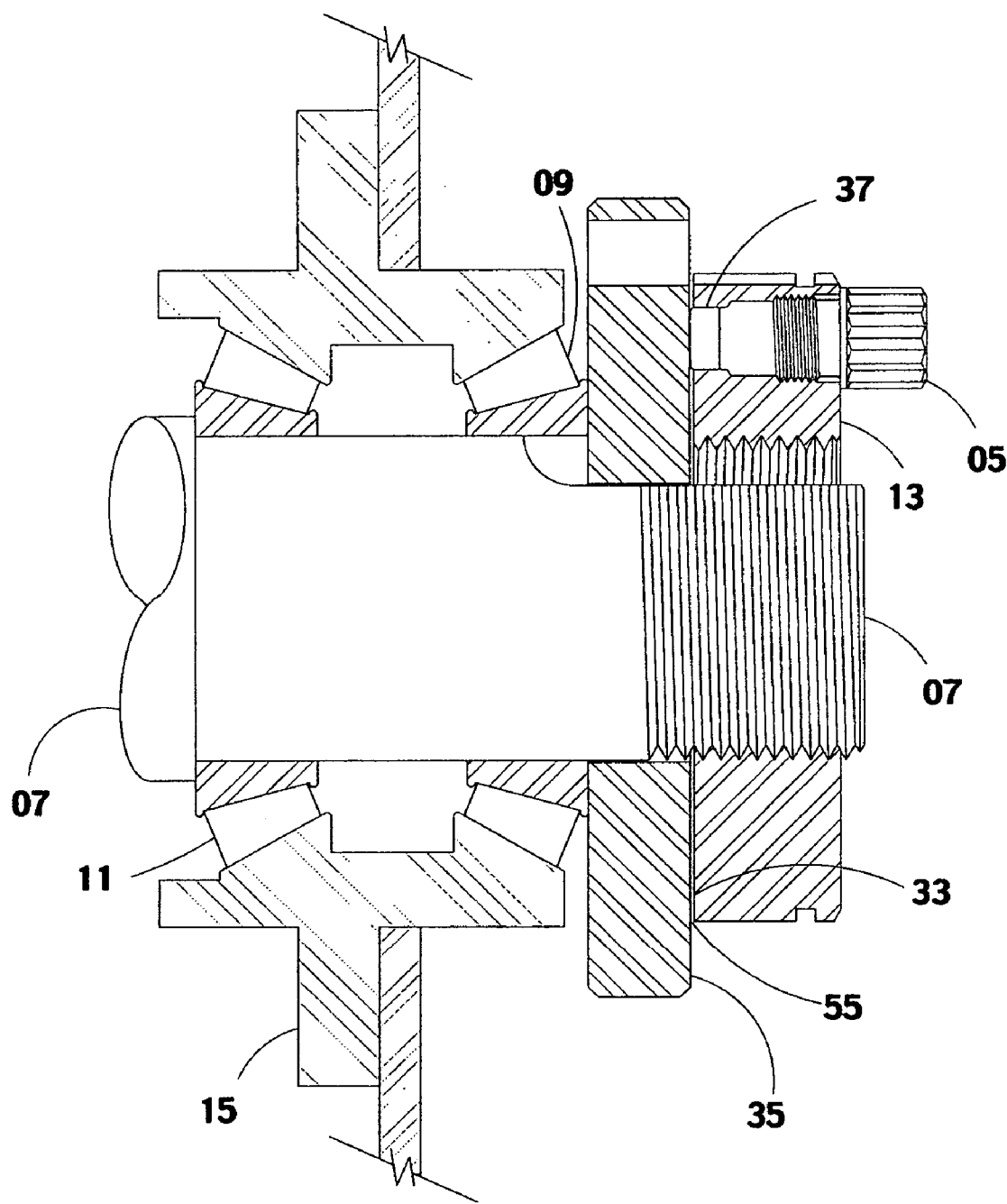
FIG. 5, Sectional view of a spindle mounted hub having tapered roller bearings, said hub being retained by a threaded spindle nut assembly, and the pressure calibration instrument installed in the threaded component of the spindle nut.

In reference to FIG. 5, Wheel hub 15 is fitted upon spindle 07, wheel hub 15 having outer and inner taper roller bearings, 09 and 11 respectively, wherein pressure calibration instrument 05 is axially installed in spindle nut 13 such that upon the loosening of spindle nut 13, boot seal 37 maintains communication with second axial structure face 35 demonstrating communication stress gap 55 which is measured by pressure calibration instrument 05.

Figure 6:
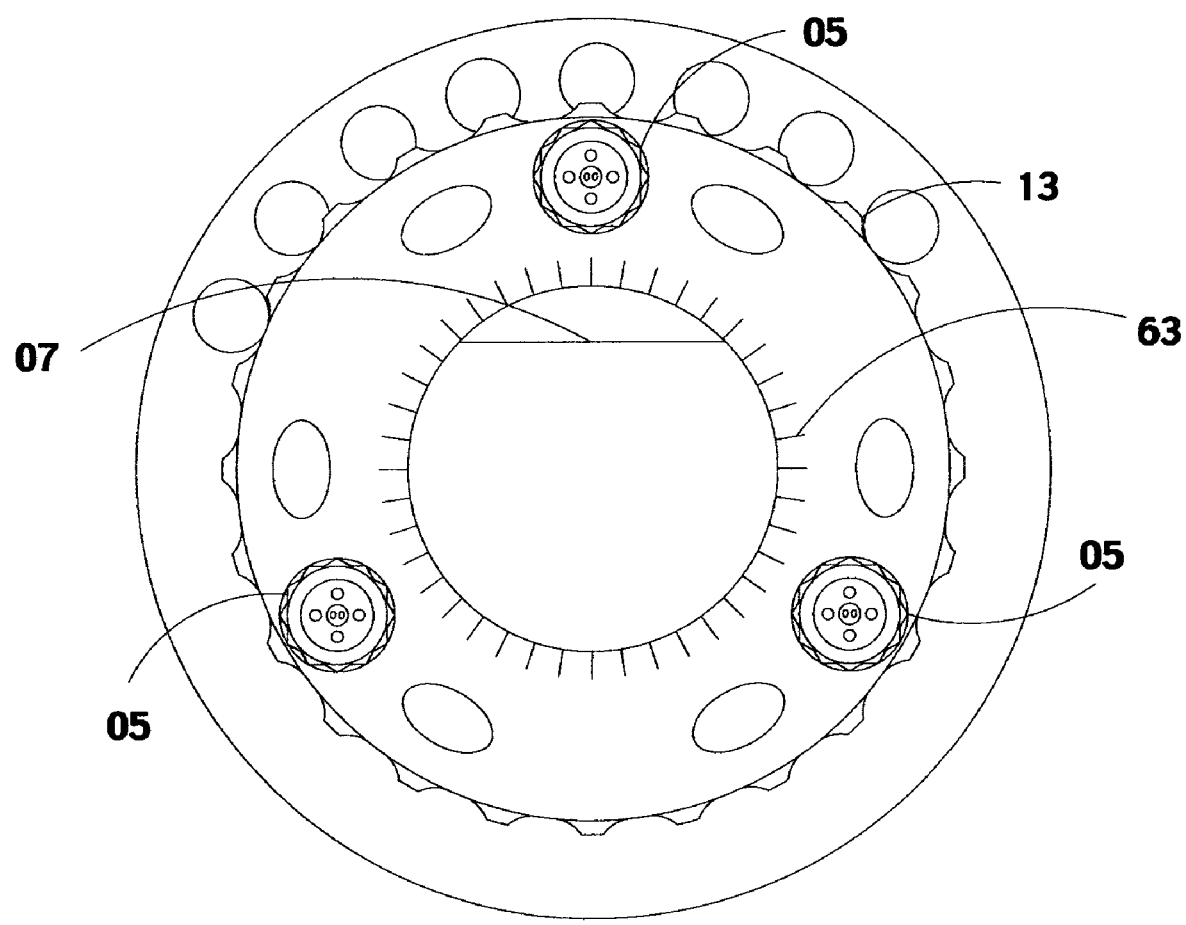
FIG. 6, Frontal view of pressure calibration instruments, as illustrated in FIG. 3, installed in the threaded spindle nut assembly illustrated in FIG. 5.

In reference to FIG. 6, Spindle 07 and the spindle nut 13 of FIG. 5, the spindle nut 13 having three axially installed pressure calibration instruments 05 and circumferential indicia 63.

Workings of the Pressure Calibration Instrument in Taper Roller Wheel Bearing Adjustment Precision axial pressure calibration is readily accomplished by means of measuring travel of micro scale 21 of the piston flagpole 23 in relationship to microreader 25 from an initial micro scale 21 position wherein the earlier measured position represents the position of a fully stressed piston 27. One or more pressure calibration instruments 05 is affixed to or incorporated within structure 31 extendable past structure face 33 which is in axial communication with a second axial structure face 35 such that boot seal 37 is also in direct communication with second structure face 35. Indicator module 39 may also function as a button to close activation switch 41, and upon activation the fail safe analysis of circuitry 19 tests all indicator mechanisms whether audible, electronic, digital, or visible such as activated LED 43, set LED 45, power pack 47, micro reader 25, and a self check of differential circuitry function of circuitry 19. Positive circuitry verification signals an indication such as illumination of activated LED 43. Pressure band 51 is in direct communication with piston 27 and holds pressure force against piston 27 such that micro axial travel of boot seal 37, in relationship to micro reader 25 through direct and indirect communication of piston pad 53, piston 27, piston flag pole 23, and micro scale 21, is measured by micro reader 25 such that as structure face 33 looses communication from second axial structure face 35, and boot seal 37 maintains communication with second axial structure face 35, micro reader 25 measures an exact increment of change of communication stress gap 55, wherein the circuitry 19 differentiates the application specific parameters such that at the pre-programmed increment of measure, as an example 0.002 inch at the specific pressure band 51 force, circuitry 19 activates indicator circuitry such as set LED 45, which illuminates until the activated circuitry times out.

Further workings of the pressure calibration instrument 05 may include the piston pad 53 function of reducing the pressure loading of boot seal 37 and also reduces axial hysteresis of piston pad 53 to piston 27 and piston 27 to cylinder bore 57. Boot seal 37 functions as a seal to isolate the internal environment of instrument cavity 59. Re-charging circuitry 61 and re-charging contact 29 permit direct or induction re-charging of power pack 47 from and external energy source.

Description of the Heavy Duty Wheel Bearing Adjustment Procedure Using Axial Pressure Calibration Instrument The Wheel Hub 15 is rotated while the screw threaded Spindle Nut 13 is over tightened such that the outer and inner tapered roller bearings 09 and 11 are preloaded. Spinning the wheel hub 15 permits the outer and inner tapered roller bearings to work their way up the inclined planes of their respective outer races, and over-tightening of the spindle nut 13 stresses the wheel hub 15 and spindle 07 assembly such that no free endplay exists and all of wheel hub 15's axially communicating members are tightly seated. Spindle nut 13 is axially fitted with one or more pressure calibration instruments.

Upon verification that all components are properly assembled, seated and pre-stressed, the technician presses the indicator module 39, which in the illustrated arrangement also engages activation switch 41. Fail safe circuitry verifies component integrity, activates micro reader 25 which then reads and holds in memory micro scale 21 initial measure upon which a successful reading and activation prompts circuitry 19 to illuminate activated LED 43. The technician sees the distinctive LED illumination, as an example bright yellow, whereupon he/she slowly loosens the Spindle Nut 13. The wheel hub 15 sits in the saddle of inner tapered roller bearing 11 and outer tapered roller bearing 09. As the stretch and compression elasticity of the pre-stressed assembly begins to relax and prior to the outer tapered roller bearing 09 having resultant outward axial travel due to the gravitational weight of Wheel Hub 15 on the incline planes of the tapered roller bearings, the force of pressure band 51 of the pressure calibration instruments 05, in direct and respectively indirect communications with piston 27, piston foot pad 53, and boot seal 37, holds second axial structure face 35 in place with sufficient force to prohibit outward axial travel of second axial structure face 35 thusly opening communication stress gap 55. Upon micro-increment measure of communication stress gap 55, satisfaction of circuitry 19 parameters, activated LED 43 switches off and set LED 45 illuminates a bright distinctive color, such as green, whereupon the technician stops the slow loosening rotation of spindle nut 13. From this exact point a specified preload is identified and may be further set from an incremental rotation of spindle nut 13 as predetermined by laboratory load cell testing and/or engineering criteria, the further rotational preload increments shown as circumferential indicia 63 on the face of spindle nut 13.

I claim:

1. A system for adjusting pressure between first and second parallel structural members, said first structural member including a threaded adjustment device for applying pressure between said first and second structural members and comprising:
    a) at least one pressure sensor device affixed to said first structural member and having a surface bearing against said second structural member, said pressure sensor providing an output perceptible by a user indicative of pressure, and;
    b) further including within said pressure sensor device an air-gap micromeasuring device for measuring an air gap between said first and second structural members.

2. The system of claim 1 wherein there is a plurality of said pressure sensor devices attached to said first structural member.

3. The system of claim 1 wherein said pressure sensor device comprises a substantially cylindrical construction threadingly engaged with said first structural member and extending transversely therethrough to contact said second structural member.

4. The system of claim 3 wherein said pressure sensor device includes an internal piston moveable in response to pressure exerted by said threaded adjustment device wherein the position of said piston is indicative of the magnitude of said air gap.

5. The system of claim 3 wherein said pressure sensor device includes a visual display indicative of pressure.

* * * * *